July 14, 1936.     J. H. DORAN     2,047,821
PACKING ARRANGEMENT
Filed July 27, 1934
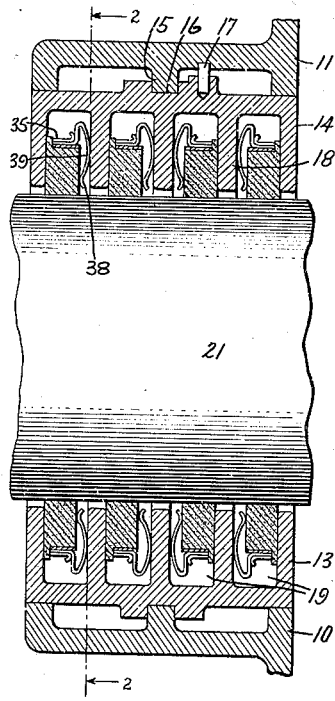
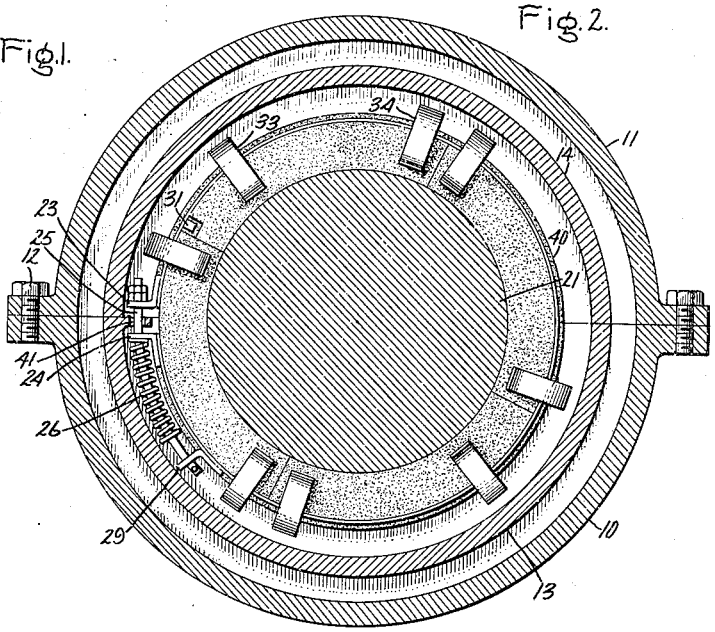
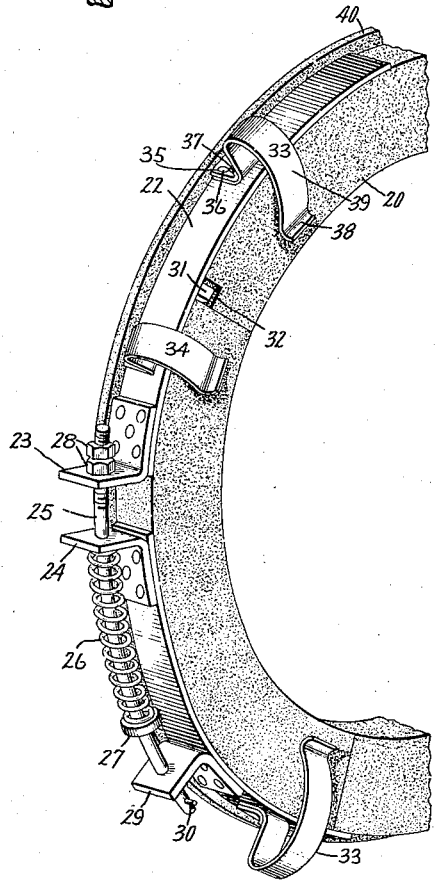
Inventor:
John H. Doran,
by Harry E. Dunham
His Attorney.

Patented July 14, 1936

2,047,821

UNITED STATES PATENT OFFICE 2,047,821

PACKING ARRANGEMENT

John H. Doran, Scotia, N. Y., assignor to General Electric Company, a corporation of New York Application July 27, 1934, Serial No. 737,237

1 Claim. (Cl. 286—22)

The present invention relates to packing arrangements between shafts and like rotary members and stationary members such as are used, for example, in elastic fluid turbines to prevent or minimize the leakage of elastic fluid along the clearance defined between the turbine casing and the turbine shaft projecting therethrough. The invention relates more specifically to the kind of packing arrangements which have a casing with a plurality of partitions or walls defining recesses or cells for accommodating packing rings. The shaft or like rotatable member and the packing rings cannot be held in constant alignment in elastic fluid turbines due to heat and pressure strains. Therefore, these packing rings usually are composed of a plurality of segments which are held in arch-bound relation floating on the shaft by spring means disposed in said cells. The packing rings must be free to float in the cells to permit realignment of the rings in radial direction in response to radial shaft movement. For this reason, it is necessary to provide for side clearances between the rings and the adjacent walls. These clearances, however, in many cases permit leakage of fluid along the walls defining the cells, especially when no axial thrust or side thrust causes the segments to hug one of the partitions or walls forming the cells. The leakage of fluid along clearances defined between the sides of the segments and the adjacent surfaces of the partitions is usually overcome by the provision of means for biasing the segments towards one of the adjacent partitions.

The general object of the present invention is to provide an improved construction of the kind of packing arrangements specified above which is reliable in operation and simple in manufacture.

For a consideration of what I believe to be novel and my invention, attention is directed to the following specification and the claim appended thereto in connection with the accompanying drawing.

In the drawing, Fig. 1 is a view of a packing arrangement embodying my invention; Fig. 2 is a sectional view along line 2—2 of Fig. 1; and Fig. 3 is a perspective view of certain elements of the packing.

The packing arrangement shown in the present instance comprises an outer and an inner casing. The outer casing has two halves, a lower half 10 and an upper half 11 provided with flanges united by bolts 12. The inner casing similarly has a lower casing half 13 and an upper casing half 14 and is held in position within the outer casing by means including an annular projection 15 on the outer casing projecting into a recess 16 formed on the outer surface of the inner casing. The annular projection 15 prevents relative sidewise movement between the two casings. Relative rotary movement between the two casings is prevented by the provision of a dowel pin or pins 17 projecting into radial openings of the two casings. The inner casing has a plurality of walls or radial annular partitions 18 which define a plurality of cells 19 for accommodating packing rings and means for maintaining the packing rings in arch-bound relation with the shaft as well as in engagement with an adjacent surface of one of the partitions. In the present instance I have shown four cells 19, each accommodating a packing ring. Such packing ring comprises a plurality of segments 20 made of carbon or like packing material. The segments are held in arch-bound relation on a shaft 21 projecting through the casing, by means including a band 22 on the outer surface of the segments. The ends of the band are provided with angles 23 and 24 which are yieldingly biased together by a clamping bolt 25 and a spring 26. The clamping bolt 25 is curved and projects through openings in the angles 23 and 24. The spring 26 surrounds the bolt and has ends engaging the angle 24 and an abutment 27 respectively on the bolt. One end of the clamping bolt is secured to the angle 23 by means of nuts 28 and the other end of the bolt is slidably arranged in a guide 29 secured to the band 22. The end projecting through the guide 29 is provided with a pin 30 to prevent disengagement between the bolt and said guide, especially during assembly. Relative rotary movement between the band 22 and the segments forming the packing ring is prevented by the provision of a stop 31 secured to the inner surface of the band 22, preferably by welding and disposed in a recess 32 of one of the segments.

The arrangement so far described holds the packing segments in arch-bound relation on the shaft 21. The arch-bound packing rings have a bore slightly larger than that of the shaft diameter. As clearly shown in Fig. 1, the axial width of the segments is smaller than the width of the cells. This, as pointed out above, is necessary to permit floating of the segments on the shaft to permit realignment of the packing rings in radial direction in response to movement of the shaft in radial direction. Leakage along clearances defined between the adjacent radial surfaces of the packing rings and the partitions forming the cells is prevented by the provision of means biasing the packing rings sidewise into engagement with the adjacent surface of one of the partitions. In the present instance the two packing rings on the right-hand side of Fig. 1 are biased towards the right, whereas the two packing rings on the left-hand side are biased towards the left. The biasing means according to my invention comprises spring means which are secured to the means for maintaining the segments in arch-bound relation. In the present instance I have shown two spring means or side springs 33 and 34 with respect to each segment of the packing rings. The spring means are in the form of bowed leaf springs having a single leaf arranged at right angles with respect to the band 22. One end of the leaf is fastened to the band 22 by means of a backing-up washer 35 and pivots 36. The backing-up washer has a bent end portion 37 to back up or stiffen the leaf. Another end portion 38 of each spring engages the segment and an intermediate or saddle portion 39 engages the adjacent surface of one of the partitions 18. With this arrangement the packing rings are securely biased towards the surface of one of the partitions whereby leakage of fluid is substantially prevented. As will be noticed, the outer surfaces of the packing segments are recessed to define an annular shoulder 40. This annular shoulder engages one edge of the band 22 and prevents relative sidewise movement between the segments and the band 22. A portion of the clamping bolt 25 intermediate the angles 23 and 24 projects through an opening 41 (Fig. 2) in a projection of the lower, inner casing half 13 in order to prevent the packing rings from rotating on the shaft, that is, to prevent or reduce relative rotary movement between the packing rings and the casing.

The side springs are so proportioned that after the packing rings with the springs are assembled and installed in the cells, a force of the order of about ten times the weight of the assembled parts must be applied to cause sidewise movement of the assembled parts within the cell. This will effectively hold the assembled parts in a position in which the inner surface of the packing rings is concentrically spaced from the shaft and remains in this position, that is, free of contact with the shaft until the latter or the casing move relatively with respect to the packing rings. When this occurs the packing rings are moved into a new position in which their inner surfaces are again concentrically spaced with respect to the shaft.

What I claim as new and desire to secure by Letters Patent of the United States is:—

In a packing arrangement, a casing having walls defining a cell, a rotatable member projecting through the casing, a packing ring in the cell comprising a plurality of segments surrounding the rotatable member, means including a band surrounding the segments and having an edge engaging a shoulder formed on the outer surface of the segments, yieldable means for biasing the ends of the band towards each other to maintain the segments in arch-bound relation, and a plurality of leaf springs for biasing the segments towards one of the walls, and means including a backing-up member for securing one end of each leaf spring to the band, another end of each leaf spring engaging a radial surface of one of the segments and an intermediate portion engaging one of said walls.

JOHN H. DORAN.